(12) United States Patent
Davis et al.

(10) Patent No.: US 9,769,161 B2
(45) Date of Patent: Sep. 19, 2017

(54) EVENT DRIVEN SECOND FACTOR CREDENTIAL AUTHENTICATION

(75) Inventors: Masha Leah Davis, Austin, TX (US); Mark Robinton, Somerville, MA (US); Peter F. Klammer, Wheat Ridge, CO (US)

(73) Assignee: ASSA ABLOY AB (SE)

(*) Notice: Subject to any disclaimer, the term of this patent is extended or adjusted under 35 U.S.C. 154(b) by 0 days.

(21) Appl. No.: 14/131,854

(22) PCT Filed: Jul. 12, 2011

(86) PCT No.: PCT/US2011/043704
§ 371 (c)(1),
(2), (4) Date: Apr. 4, 2014

(87) PCT Pub. No.: WO2013/009301
PCT Pub. Date: Jan. 17, 2013

(65) Prior Publication Data
US 2014/0331286 A1    Nov. 6, 2014

(51) Int. Cl.
*H04L 29/06* (2006.01)
*G07C 9/00* (2006.01)
(Continued)

(52) U.S. Cl.
CPC .......... *H04L 63/0853* (2013.01); *G06F 21/34* (2013.01); *G06Q 20/3821* (2013.01); *G06Q 20/40* (2013.01); *G07C 9/00031* (2013.01); *G07F 5/18* (2013.01); *G07F 17/14* (2013.01); *H04L 9/3215* (2013.01);
(Continued)

(58) Field of Classification Search
CPC . H04L 63/0853; H04L 9/3226; H04L 9/3234; H04L 9/3215; H04L 63/083; G07C 9/00031; G07F 5/18; G07F 17/14; G06Q 20/40; G06Q 20/3821; G06F 21/34
See application file for complete search history.

(56) References Cited

U.S. PATENT DOCUMENTS 6,720,860 B1 * 4/2004 Narayanaswami ..... G06F 21/31
340/5.54
7,079,652 B1 * 7/2006 Harris ........................... 380/258
(Continued)

FOREIGN PATENT DOCUMENTS

GB    2388229    11/2003

OTHER PUBLICATIONS

Pu, Qiong, An Improved Two-factor Authentication Protocol, Apr. 2010, 2010 Second International Conference on Multimedia and Information Technology, p. 223-226.*
(Continued)

*Primary Examiner* — Kenneth Chang
(74) *Attorney, Agent, or Firm* — Sheridan Ross P.C.

(57) ABSTRACT

A reader configured to perform dual-factor authentication is provided. The reader is configured to analyze credential data as well as event-based user inputs. The event-based user inputs are received in response to the reader presenting one or more events to a user and monitoring the user's reaction thereto. Utilization of an event-based user input enables the reader to perform dual-factor authentication without necessarily being provided with a keyboard or other advanced user input device.

19 Claims, 4 Drawing Sheets

(51) Int. Cl.
*H04L 9/32* (2006.01)
*G06F 21/34* (2013.01)
*G07F 17/14* (2006.01)
*G06Q 20/40* (2012.01)
*G07F 5/18* (2006.01)
*G06Q 20/38* (2012.01)

(52) U.S. Cl.
CPC .......... *H04L 9/3226* (2013.01); *H04L 9/3234* (2013.01); *H04L 63/083* (2013.01); *H04L 2209/805* (2013.01); *H04L 2463/082* (2013.01)

(56) References Cited

U.S. PATENT DOCUMENTS

| | | | | |
|---|---|---|---|---|
| 7,986,816 | B1* | 7/2011 | Hoanca | G06K 9/00597 382/115 |
| 8,643,475 | B1* | 2/2014 | Kohno | G06K 19/07345 235/380 |
| 2001/0049785 | A1* | 12/2001 | Kawan | G06Q 20/3674 713/156 |
| 2004/0031856 | A1 | 2/2004 | Atsmon et al. | |
| 2004/0162982 | A1* | 8/2004 | Komai | 713/168 |
| 2004/0230843 | A1* | 11/2004 | Jansen | G06F 21/36 726/7 |
| 2005/0010768 | A1* | 1/2005 | Light | G06F 21/36 713/168 |
| 2005/0273624 | A1* | 12/2005 | Serpa | G06F 21/316 713/183 |
| 2006/0026440 | A1 | 2/2006 | Sauvebois | |
| 2006/0136997 | A1* | 6/2006 | Telek | G01S 11/06 726/5 |
| 2006/0190730 | A1* | 8/2006 | Iwamura | H04L 9/0838 713/171 |
| 2006/0266823 | A1* | 11/2006 | Passen | G07F 9/026 235/381 |
| 2008/0046967 | A1* | 2/2008 | Pan et al. | 726/2 |
| 2008/0052419 | A1* | 2/2008 | Oda | G06K 7/0008 710/7 |
| 2008/0052522 | A1* | 2/2008 | McArdle | H04L 9/3234 713/182 |
| 2009/0259588 | A1 | 10/2009 | Lindsay | |
| 2010/0039220 | A1 | 2/2010 | Davis | |
| 2010/0180336 | A1* | 7/2010 | Jones | H04L 9/3226 726/19 |
| 2010/0235905 | A1* | 9/2010 | Guthery | G06F 21/31 726/19 |
| 2011/0162067 | A1* | 6/2011 | Shuart | G06F 21/31 726/19 |
| 2011/0226849 | A1* | 9/2011 | Padilla | G06K 7/0004 235/375 |

OTHER PUBLICATIONS

De Luca et al. "ColorPIN," Proceedings of the 28th International Conference on Human Factors in Computing Systems, Jan. 1, 2010, 4 pages.
Extended Search Report for European Patent Application No. 11869463.7, dated Mar. 9, 2015 8 pages.
International Search Report and Written Opinion for International (PCT) Patent Application No. PCT/US11/43704, mailed Nov. 16, 2011 7 pages.
International Preliminary Report on Patentability for International (PCT) Patent Application No. PCT/US2011/043704, mailed Jan. 23, 2014 6 pages.

* cited by examiner

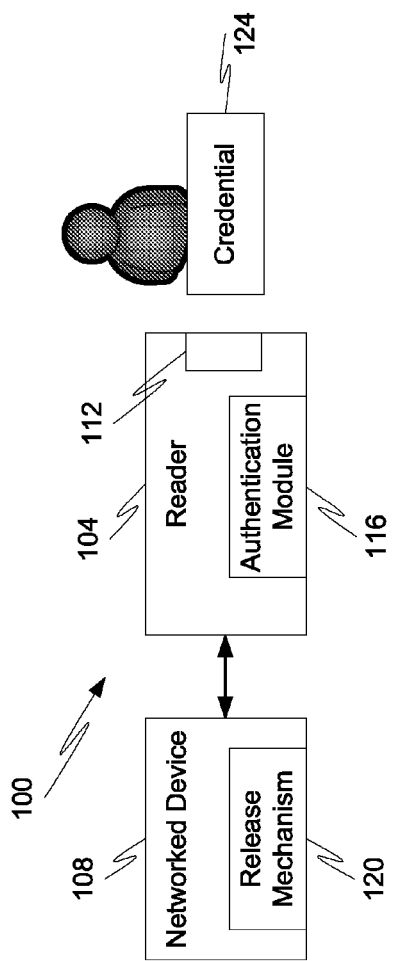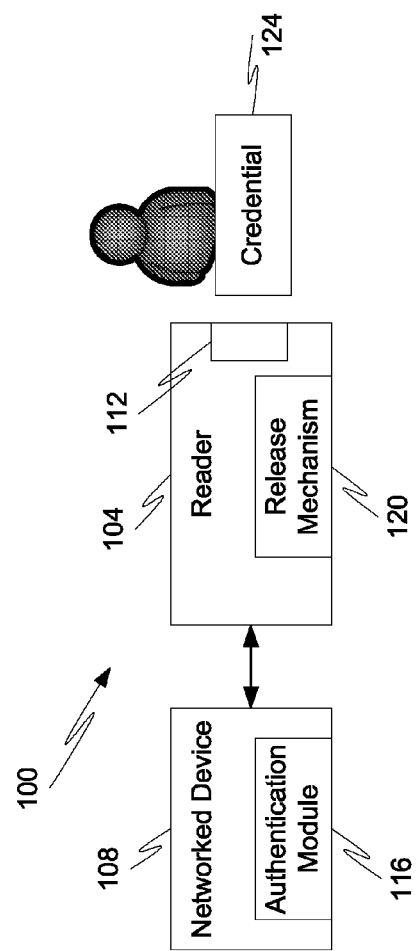

EVENT DRIVEN SECOND FACTOR CREDENTIAL AUTHENTICATION

CROSS REFERENCE TO RELATED APPLICATION

This application is a national stage application under 35 U.S.C. 371 of PCT Application No. PCT/US2011/043704, having an international filing date of Jul. 12, 2011, which designated the United States, and which is hereby incorporated by reference in its entirety.

FIELD OF THE DISCLOSURE

The present disclosure is generally directed toward data entry and authentication protocols.

BACKGROUND

Due to the popularity of the use of Radio Frequency Identification (RFID) readers in Physical Access Control Systems (PACS) and the difficulty in making credentials secure from being stolen, lost, cloned, etc., there is a real need to use additional factors of authentication. The axiom of something you have, something you know, and something you are has traditionally been used to increase the security of a PACS employing machine-readable credential technologies such as RFID, magnetic stripe, bar code, Wiegand, and others. The more "factors" of authentication that are utilized, the higher the confidence that the person presenting the credential is actually the person to whom the credential was originally issued.

Traditionally, a biometric reader has been deployed to acquire a second factor of authentication representing "something you are". While biometric readers are useful for increasing the security of a PACS, deployment of a biometric reader is more costly than the use of, for example, a keypad to query the user as to "something you know".

SUMMARY

It is, therefore, one aspect of the present disclosure to provide an alternative mechanism for determining a second factor of "something you know". In particular, embodiments of the present disclosure test a user's knowledge of an "event" to determine the second factor of authentication. The type and number of events used to determine the second factor of authentication can vary depending upon circumstances and the level of security desired. In some embodiments, events can be the number of flashes of a Light Emitting Diode (LED), the number of illuminated LED's, the pattern of illuminated vs. unlit LEDs, the color of one or more LEDs, the number of beeps emitted by a reader, a number in a display, a specific picture in a display, among others. These events could occur on the reader itself, on a credential with a display, or even on a mobile phone being used as a Near Field Communications (NFC) credential. In one such example, a user can present his credential to an RFID reader, hold it in the RF field of the reader, and then remove it after the reader's LED has blinked three times, thereby proving that the user knows the secret number of LED blinks.

Further embodiments of the disclosure allow that the credential could be presented only at a specific event as opposed to being removed after an event has occurred.

Information related to the actual event could be stored on the credential itself, could be stored in the reader or even calculated in the reader based on the data inside the credential, and/or could be verified by an upstream device such as a panel or a host computer. In the latter case, the event data could be stored in a database in addition to coming from the credential data or calculated from the credential data.

For even more security, specifically for preventing a perpetrator from observing a user presenting his credential to a reader and responding to the proper event, the event data or even type of event can be periodically changed. The change can occur daily, after hours, or even when the secured facility is at an elevated threat level.

Of course, additional security is also increased when more than one event type is deployed or an event is repeated more one or more times with different event data.

Note that, in the example presented above, even if the number of blinks to count is kept low (e.g., zero through three) in order to make it easier and faster, this disclosure still offers additional security. Another mechanism that can be deployed to detect repeated wrong event attempts (i.e., "brute forcing") is disclosed in US Patent Publication No. 2010/039220 entitled, "RFID reader with embedded attack detection heuristics" to Davis, the entire contents of which are hereby incorporated herein by reference. The embedded attack detection heuristic, in some embodiments, impart increasing time penalties in which the credential will not be accepted or the reader may be disabled as necessary. Utilization of these embedded attack detection heuristics in combination with the second factor authentication protocols described herein may further increase the security of an access control system.

There are many advantages associated with utilizing the event-based authentication protocols described herein. For example, a lost or stolen credential cannot easily be used without knowing what the "event" is that allows the credential to be read. Similarly, the "bump and clone" attack in which a perpetrator comes close enough to a card holder to surreptitiously use an electronic cloning device to create a cloned credential will not know the "event" that allows the credential to be accepted by a reader when the credential is subsequently used.

The second factor of authentication facilitated by this disclosure adds no additional hardware costs, no keypad to vandalize or become inoperative due to weather conditions; thereby minimizing implementation costs.

These protocols are particularly well suited for use in mobile phones with NFC due to the rich peripherals in a cell phone including keypad, graphics display, audio capability, and LED's.

While no secure access system can ever be 100% effective against the use of clone, lost or "stolen" credentials, it is one aspect of the present disclosure to try and thwart or ameliorate these attacks.

If the protocols described herein are implemented in a reader, then embodiments of the present disclosure can provide a significant advantage in upgrading the security of legacy upstream devices in which the firmware cannot or will not be updated because of cost or the fact that the manufacturer no longer supports such a system. While it is optimal for these detection methods to be incorporated in the reader, they may also be included in the upstream device as well.

In some embodiments a method of authenticating a holder of a credential is provided which generally comprises:
  detecting, at a reader, user input related to one or more events controlled by the reader;
  analyzing the event-based user input; and based on the analysis of the event-based user input, determining whether the user that provided the user input is allowed access to an asset protected by the reader.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures:

FIG. 1 is a block diagram depicting a first access control system configuration in accordance with at least some embodiments of the present disclosure;

FIG. 2 is a block diagram depicting a second access control system configuration in accordance with at least some embodiments of the present disclosure;

DETAILED DESCRIPTION

Figure 3:
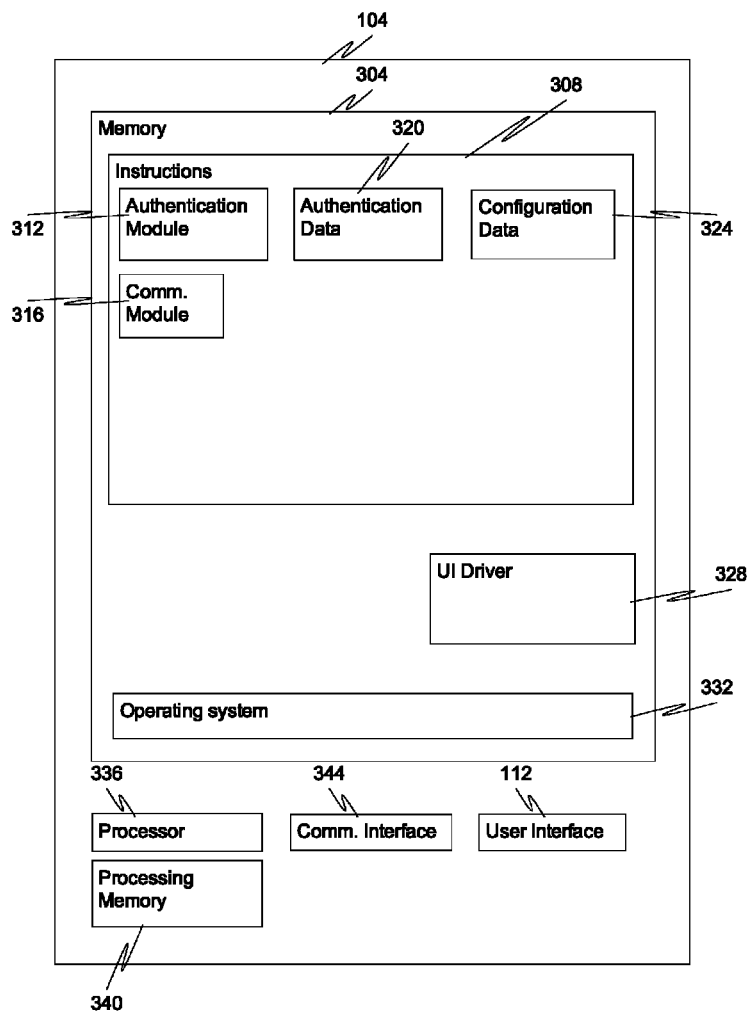
FIG. 3 is a block diagram depicting components of a reader in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

FIGS. 1 and 2 show illustrative configurations of an access control system 100 in accordance with embodiments of the present disclosure. Both configurations of the access control system 100 include a reader 104 that is generally provided at a strategic location to secure one or more assets. In some embodiments, the reader 104 is in communication with a networked device 108 via a first communication link. The first communication link between the reader 104 and networked device 108 may be established over a secured or unsecured communication network via TCP/IP, Wi-Fi, Zigbee, Cellular modem, RS485, current loop, and/or Wiegand. Such a reader 104 is referred to as a networked reader because the reader 104 provides some or all data used in making an access control decision to the networked device 108. In the embodiment depicted in FIG. 2, the networked device 108 comprises the necessary functionality, in the form of an authentication module 116, to analyze the data received from the reader 104 and make an access control decision for the reader 104. A control panel is one example of a networked device typically used in the access control industry. Other types of networked devices 108 include a host computer with or without a web server, a server providing Software as a Service (SaaS), a cloud-based application, or the like.

After the access control decision has been made at the authentication module 116 of the networked device 108, the networked device 108 communicates the results of the decision back to the reader 104, which comprises a release mechanism 120 that is enabled to either release one or more assets if a decision has been made to grant access or maintain such assets in a secure state if a decision has been made to deny access. For access control applications, the release mechanism 120 is typically a relay, servo motor, or switch, whereas in logical access applications, the release mechanism 120 is realized by software instructions.

In an alternative configuration depicted in FIG. 1, the release mechanism 120 may be provided in the networked device 108 and the authentication module 116 may be provided in the reader 104. In this configuration, the reader 104 may make the access control decisions and report the results of those decisions to the networked device 108 which selectively activates the release mechanism 120 depending upon the results of the decision made by the authentication module 116.

One function of a reader 104 is to control access to certain assets. More specifically, a reader 104 may be positioned at an access point for a given asset (e.g., a door for a room, building, or safe, a computer for electronic files, and so on). Unless a user provides the reader 104 with a valid input (e.g., by responding to a predetermined event at a predetermined time) and presents a valid credential 124, the access point is maintained in a secure state such that admittance or access to the asset is denied. If the credential 124 and the user are properly authenticated, then the reader 104 has the discretion to allow the user access to the asset and implement various other actions accordingly.

A credential 124 is a device that carries evidence of authority, status, rights, and/or entitlement to privileges for a holder of the credential. A credential 124 is a portable device having memory and a reader interface (i.e., an antenna and Integrated Circuit (IC) chip) which enables the credential 124 to exchange data with the reader 104, usually via a credential interface of the reader 104. One example of a credential 124 is an RFID proximity card (usually operating at 125 kHz carrier frequency) or RFID smartcard (usually operating at 13.56 MHz carrier frequency) that has data stored thereon allowing a holder of the credential 124 to access an asset protected by a reader 104. Examples of a machine-readable credential include, but are not limited to, proximity RFID-based cards, access control cards, credit cards, debit cards, passports, identification cards, key fobs, Near Field Communications (NFC)-enabled cellular phones, Personal Digital Assistants (PDAs), tags, or any other device configurable to emulate a virtual credential.

In embodiments where the reader 104 is configured to receive both event-based user input via the user interface 112 and credential input from a credential 124 carried by the user, the reader 104 is capable of performing dual-factor authentication by verifying both the validity of event-based user input (i.e., something that the user knows) as well as the validity of credential input (i.e., something that the user has).

As noted above, the networked device 108 may be responsible for making some or all of the asset-access decisions based on data received at the reader 104 from the user. In some embodiments, the reader 104 may not be connected to a networked device 108, in which case the reader 104 is referred to as a stand-alone reader. Stand-alone readers comprise the decision-making components necessary to analyze input received from a user and determine, based on the received input, if the user is entitled to access an asset secured by the reader 104. The access control rules for entry including time zone, day of week, etc. may be contained in a database in the stand-alone reader that is programmable by methods including using the keypad itself, using a PDA or mobile phone via NFC, infrared light, audio, or a wired connection. In some cases, the access control decision rules may be contained in the machine-readable credential read at the reader incorporated into the stand-alone device/user input combination. Stand-alone readers are generally desirable in situations where a reader 104 is in an isolated location and a communication link between the networked device 108 and reader 104 is not easily established.

In configurations where the reader 104 is a networked reader, a communications network may be used to establish the communication link between the reader 104 and networked device 108. Exemplary communication networks may provide bi-directional communication capabilities, which may selectively be implemented in a form of wired, wireless, fiber-optic communication links, or combinations thereof. Even though the communication link between the networked device 108 and reader 104 is depicted as bi-directional, one skilled in the art can appreciate that the communication link may be unidirectional. As one example, the reader 104 may utilize the Wiegand protocol to communicate with the networked device 108.

The communication link between the reader 104 and networked device 108 may be implemented utilizing buses or other types of device connections. The protocols used to communicate between the networked device 108 and the reader 104 may include one or more of the TCP/IP protocol, RS 232, RS 485, Current Loop, Power of Ethernet (POE), Bluetooth, Zigbee, GSM, WiFi, and other communication methods and protocols known in the art.

The networked device 108 may be a general-purpose computer adapted for multi-task data processing and suitable for use in a commercial setting. Alternatively, the networked device 108 may be implemented as a host computer or server and the reader 104 can be connected to the host computer via a TCP/IP connection or other type of network connection. A memory comprising a database of records for the system 100 may be associated with the networked device 108. The database, although not depicted, may be integral with or separated from the networked device 108 or it may be incorporated into the reader 104. The database maintains records associated with the readers 104, users, algorithm(s) for acquiring, decoding, verifying, and modifying data contained in the readers 104, algorithm(s) for testing authenticity and validity of event-based user inputs, algorithm(s) for implementing actions based on the results of these tests, and other needed software programs. Specific configurations of the networked device 108 are determined based on and compliant with computing and interfacing capabilities of the readers 104.

With reference now to FIG. 3, additional details of a reader 104 will be described in accordance with embodiments of the present invention. The reader 104 may comprise memory 304 that includes a number of instructions 308, modules, and other data structures as well as a processor 336 for executing the instructions 308 and other contents of memory 304.

The reader 104 may also include a communication interface 344 which allows the reader 104 to communicate with a networked device 108. Exemplary types of communication interfaces 344 include, without limitation, an RF antenna and driver, an infrared port, a fiberoptics interface, a Universal Serial Bus (USB) port, an Ethernet port, a serial data port, a parallel data port, any type of interface which facilitates communications over a packet-based communication network, such as the Internet, and so on.

The reader 104 may further include a credential interface (not depicted) which enables the reader 104 to communication with one, two, three, or more different types of credentials. The type of credential interface provided on the reader 104 may vary according to the type of credential that is in the system 100. In some embodiments, the credential interface includes one or more of an antenna, an array of antennas, an infrared port, an optical port, a magnetic stripe reader, a barcode reader or similar machine-vision components, a Near Field Communications (NFC) interface, or any other component or collection of components which enables the reader 104 to communicate with credentials and other portable memory devices. In some embodiments, the credential interface enables the reader 104 to read one or more non-RFID machine-readable credentials including one or more of magnetic stripe cards, bar codes, Wiegand cards, Hollerith, infrared, Dallas 1-wire, and barium ferrite.

In some embodiments, the credential interface and communication interface 344 are of the same type (i.e., RF communication interfaces). In some embodiments, the credential interface and communication interface 344 are implemented as a single interface. Thus, the reader 104 may be enabled to communicate with credentials and networked devices 108 by using the same hardware components.

In addition to a communication interface 344, the reader 104 may include a user interface 112 which facilitates user interaction between the reader 104 and a user thereof. As will be discussed in further detail herein, the user interface 112 may include one or more user inputs, one or more user outputs, or a combination user input/output. Exemplary user inputs include, without limitation, keypads (traditional or laser-projected), buttons, switches, a peripheral device such as a touch pad peripheral included as part of a PC or as a separate peripheral connected by, for example, USB, a mouse/trackball wheel, a mouse or trackball movement, optical detection technologies, pressure sensitive device, resistive, capacitive touch, electrostatic, or magnetic screen enabled to detect finger and pen input, rotating door knob, combination, lock, or the like. Exemplary user outputs include, without limitation, lights, display screens (projection, LCD, LED, OLED, plasma, etc.), individual LED's, seven segment LED display, multi-digit LED display, etc. Exemplary combination user input/outputs may include a touch-screen interface, a multi-touch-screen interface (i.e., a touch-screen interface adapted to recognize multiple simultaneous touches, gestures, "pinches") or any other type of interface which is capable of simultaneously displaying a user output and receiving a user input.

In addition to memory 304, the reader 104 may also include processing memory 340, which may be in the form of a Randomly Accessible Memory (RAM), cache memory, or any other type of memory used to facilitate efficient processing of instructions 208 by the processor 336.

Whereas the processing memory 340 is used to temporarily store data during processing tasks, the memory 304 is provided to store permanent instructions 308 which control the operational behavior of the reader 104. The memory 304 and/or 340 may be implemented using various types of electronic memory generally including at least one array of non-volatile memory cells (e.g., Erasable Programmable Read Only Memory (EPROM) cells or FLASH memory cells, etc.) The memory 304 and/or 340 may also include at least one array of dynamic random access memory (DRAM) cells. The various routines and modules which may be included in memory 304 comprise one or more of an authentication module 312, authentication data 320, a communication module 316, and configuration data 324.

The communication module 316 provides instructions which enable the reader 104 to communicate with other devices. In particular, the communication module 316 may comprise message encoding and/or decoding instructions, message encryption and/or decryption instructions, compression and/or decompression instructions, trans-coding instructions, and any other known type of instructions which facilitate communications over a communications network. For example, the communication module 316 may comprise instructions which enable the reader 104 to create one or more messages or communication packets which are appropriately formatted and transmitted in accordance with a known communication protocol via the communication interface 344. Likewise, the communication module 316 may also comprise instructions which enable the reader 104 to format messages received over the communication interface 344 for processing by various other components of the reader 104.

Another module which may be provided in the instructions 308 is an authentication module 312 that is capable of receiving data from one or both of the credential interface and the user input portion of the user interface 112, analyzing the received data, and determining if the received data corresponds to valid data. In some embodiments, the authentication module 312 may refer to authentication data 320 which is also stored in memory 304. In some embodiments, the authentication data 320 may comprise a list of valid event-based user inputs, authorized credentials and their corresponding credential data, and any other data that can be used to verify the authenticity of a user or a credential 124. Alternatively, the authentication data 320 may comprise algorithms for analyzing received data and determining if such data is valid.

Configuration data 324 may also be maintained in memory 304. In some embodiments, the configuration data 324 describes operating characteristics of the reader 104 such as model number, firmware version(s), software version(s), reader 104 identifier, and other data which describes the reader 104. The characteristics of reader 104 may be inherent characteristics or provisioned characteristics.

The authentication module 312 may also contain instructions for controlling one or more events presented by the reader 104 as well as instructions for analyzing user inputs received in response to the presentation of such events.

Other components of memory 204 may include a User Interface (UI) driver 328 and an operating system 332, which is a high-level application that facilitates interactions between various other modules and applications in memory 204 and hardware components of the reader 104. The UI driver 328 may be responsible for facilitating operations of the user interface 112. In some embodiments, the UI driver 328 includes commands for determining when user inputs are received at the user interface 112, identifying parameters of user inputs received at the user interface 112, conditioning parameters of use inputs received at the user interface 112 into data values which can be processed by the modules contained in memory 304, determining what and when to display data as an output at the user interface 112, and the like. In other words, the UI driver 328 may contain any commands necessary to implement user interface 112 operations as requested by the other modules of the reader.

The processor 336 may include any general-purpose programmable processor, digital signal processor (DSP) or controller for executing application programming. Alternatively, the various modules described herein may be implemented as hardware or firmware rather than software and the processor 304 may comprise a specially configured Application Specific Integrated Circuit (ASIC).

Figure 4:
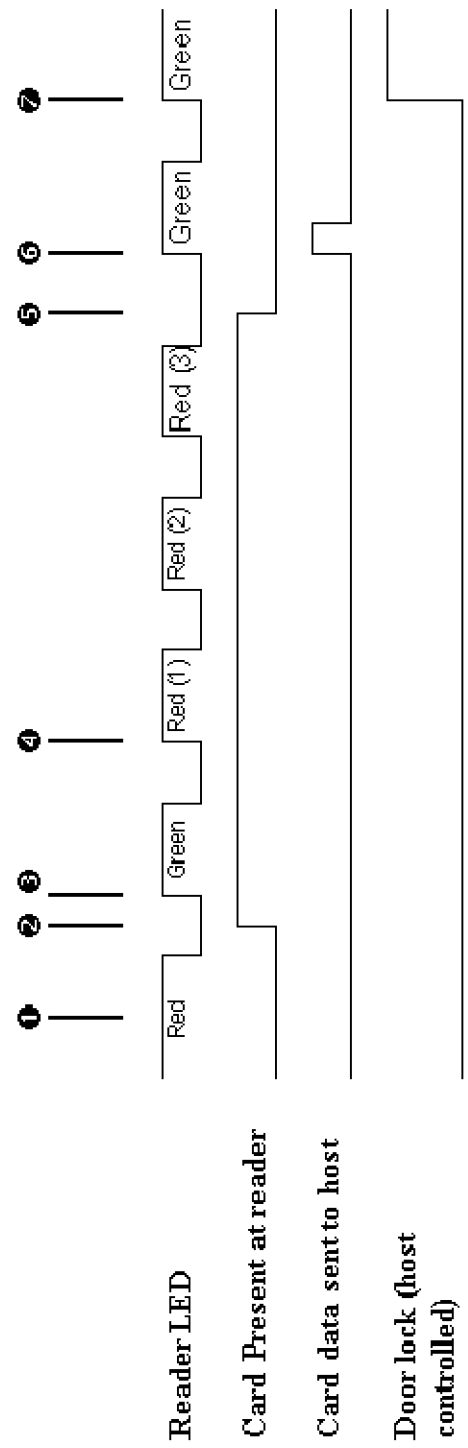
FIG. 4 depicts a method of dual factor authentication for a sequence of events when a user presents his credential and in which a virtual PIN is "3" in accordance with embodiments of the present disclosure.

As discussed above, the authentication module 212 may be configured to receive and analyze event-based user inputs. One example of a reader 104 presenting an event and receiving an event-based user input in response thereto is depicted in FIG. 4. In particular, FIG. 4 depicts a time-line view of a sequence of events when a user presents their credential 124 in which the "virtual" PIN is three according to an embodiment of the present disclosure.

At "resting" state S1, reader LED is red indicating that the door is locked and the reader 104 is waiting for the presentation of a credential 124.

At state S2, user presents the credential 124 to the reader 104 and maintains it in the reader's 104 RF field.

At state S3, card data is read and reader LED flashes green once to acknowledge that the card data has been read.

At state S4, reader 104 begins presentation of an event or series of events by flashing its red LED periodically (e.g., every ¼ second) to "count" time.

At state S5, the user removes the credential 124 from the reader's 104 RF field.

At state S6, because the user's second authentication number was 3 and the user removed the credential 124 from the reader's 104 RF field after the third flash of the reader's LED, the LED is briefly illuminated in green as acknowledgement that the authentication was successful and the card data is transmitted by the reader 104 to the networked device 108 or analyzed by the authentication module 116 of the reader 104. This acknowledgment is optional and the implementation may decide that the authentication module's 116 action of unlocking the door or not will be the acknowledgement that all is okay and the credential and event-based user information was accepted.

By holding the card data until a valid event-based user input has been received, the reader 104 prohibits the transmission of potentially corrupted or fraudulent card data to the authentication module 116. This minimizes processing requirements imposed on the authentication module 116 and further protects the authentication module 116 for inadvertently issuing a valid credential command until it is already determined that the credential 124 is being carried by a user that knows some other secret required to gain access to the asset protected by the reader 104.

At state S7, the authentication module 116 has decided that this is a valid credential 124 presented at an allowed door at an allowed time and unlocks the door as well as asserting the reader's 104 LEDCTL control signal which causes the reader 104 LED to be illuminated in green providing the user feedback that the credential 124 is valid and that the door is now unlocked.

After the door unlock period has ended, the authentication module 116 un-asserts the reader's 104 LEDCTL signal, the LED then turns green and the process starts again when another credential 124 is presented to the reader 104.

Figure 5:
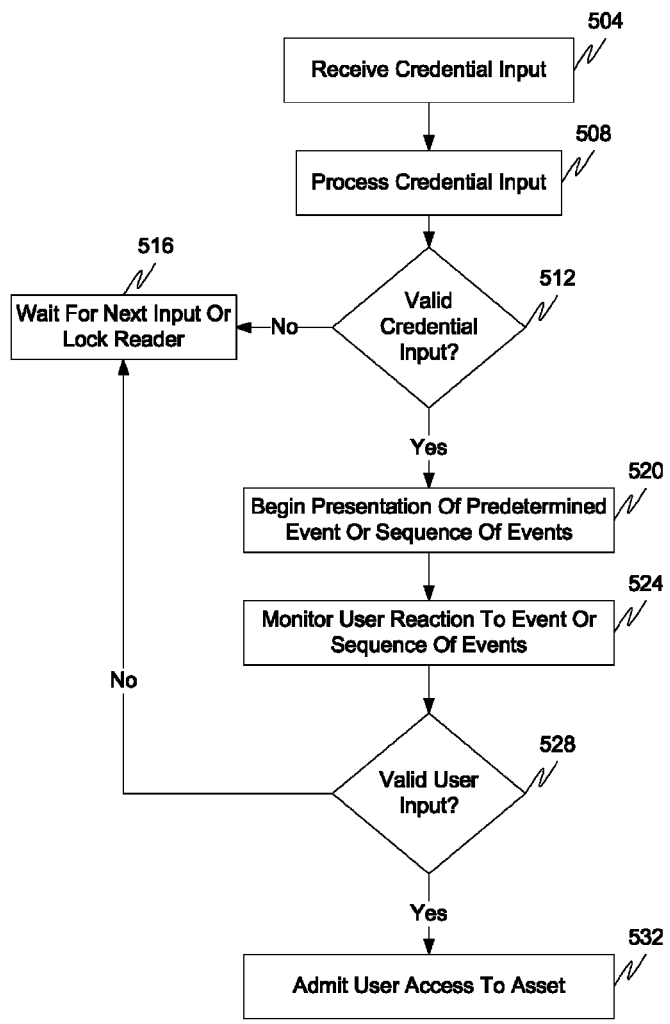
FIG. 5 depicts a dual factor authentication method in accordance with embodiments of the present disclosure.

With reference now to FIG. 5, a flow chart depicting a dual-factor authentication method will be described in accordance with at least some embodiments of the present disclosure. The method is initiated when a credential 124 is detected at a reader 104 and the reader 104 reads data from the credential (step 504). This reading step may involve the reader 104 generating an RF field sufficient to power the credential 124 and cause the credential 124 to respond with data stored in its internal memory. The reading step may be varied depending upon the type of reader 104 and credential 124 employed. For example, if the credential 124 is a magstripe card, then the reader 104 may read data from the credential 124 when the credential 124 is passed through a magnetic swipe interface provided on the reader 104. As another example, if the credential 124 comprises a barcode, then the reader 104 may read data from the credential 124 by utilizing any number of known machine-vision techniques. Any other known method of transferring data from a credential 124 to a reader 104 may be employed in this step.

Upon receiving the credential input, the reader 104 invokes one or more of its modules (e.g., the authentication module 312) to analyze the credential data and determine whether such data corresponds to valid credential data (step 508). This step may involve comparing the received credential data with the authentication data 320 to determine if the credential 124 corresponds to a valid credential.

Based on the analysis of the credential data, the reader 104 determines whether the credential data corresponds to valid credential data (step 512). If the query of step 512 is answered negatively, then the dual-factor authentication method is terminated and the reader 104 is configured to wait for more credential data (step 516). Alternatively in this step, the reader 104 may be configured to respond to a potential attack on the reader 104 by (i) slowing down its processing clock; (ii) disabling some or all functions of the reader 104 until rebooted by authorized personnel; and/or (iii) sounding an alarm to indicate an attack on the reader 104. The manner in which the reader 104 responds to the invalid credential data may depend upon whether or not the recently received credential data was a first instance of invalid data or whether a plurality of invalid credential data reads have occurred within a predetermined period of time.

Referring back to step 512, if the credential data corresponds to valid credential data, then the method continues with the reader 104 beginning a presentation of one or more predetermined events (step 520). During the presentation of the one or more predetermined events, the reader 104 may also monitor the user's reaction to the events with its user interface 112 (step 524). If the event-based user input monitored by the reader 104 (step 528) corresponds to valid event-based user input, then the reader 104 will admit the user access to the asset protected by the reader 104 (step 532). If, however, the user input received in response to the event(s) does not correspond to valid user input, then the method terminates and returns to step 516.

As noted above with respect to FIG. 4, upon receiving valid user input, the reader 104 may be configured to transfer the credential data to a networked device 108. Thus, the analysis of the credential data may occur after the analysis of the event-based user input. Furthermore, the credential data may be analyzed multiple times and in different ways each time. For example, a first analysis of the credential data by the reader 104 may only involve checking to see whether the credential 124 has provided a valid site code. A second analysis after the event-based user input has been determined to be valid may involve analyzing card numbers, keys, or other secured data maintained on the credential 124. The first analysis may be performed by the reader 104, whereas the second analysis may be performed by a networked device 108.

Furthermore, the manner in which events are presented by the reader 104 and event-based user inputs are received at the reader 104 may vary depending upon the capabilities of the reader 104 and the amount of security desired. For instance, a single valid event-based user input may be known to multiple users. Each of the users may be permitted access by providing the same event-based user input (e.g., by responding with a valid "virtual" PIN of 3 or a common sequence of digits).

To provide a higher level of security, each user may be provided with a different secret and dual-factor authentication with a particular secret may require that a particular credential 124 be presented at the same time. More specifically, a first user may be provided with a first credential 124 and may be given a first secret corresponding to a first event-based user input. A second user of the same system may be provided with a second credential 124 and may be given a second secret corresponding to a second event-based user input that is different from the first event-based user input. If any user presents the first credential 124, they will have to provide the first event-based user input to successfully complete the dual-factor authentication. Even if the second event-based user input (i.e., a valid user input if provided with the second credential 124) is provided, that user input will be determined to be invalid since it was not presented with the appropriate credential 124.

In some embodiments, valid event-based user inputs could be digitally encoded as a number on a credential 124 (particularly useful where each credential 124 has its own secret assigned thereto), encoded as an algorithm based on card data, or encoded as data from a host. The valid event-based user inputs in the authentication data 320 could be periodically changed or could be knowingly altered (e.g., based on changing data such as day of week, month of year, etc.).

As can be appreciated, variations between a single secret for each user and a single secret for all users may be employed without departing from the scope of the present disclosure.

Other ways in which event presentations are varied can depend on the type of user interface 112. In some embodiments, events may be presented by altering a visible characteristic of the reader 104. In some embodiments, events may be presented by providing one or more audible indicators. Combinations of visible and audible events may also be utilized.

In some embodiments, a sequence of events may be used to gather event-based user inputs. As one example, a 3-digit PIN may be entered by a user by holding a credential 124 in an RF field of the reader 124 (e.g., within 1 to 3 meters of the reader 104) for X beeps (where X corresponds to the first digit in the 3-digit PIN), removing the credential for Y beeps (where Y corresponds to the second digit in the 3-digit PIN), holding the credential 124 in the RF field of the reader 124 for Z beeps (where Z corresponds to the third digit in the 3-digit PIN). This sequence may be altered to accommodate a greater or lesser number of digits and the events presented during the sequence do not necessarily have to correspond to the same types of events (e.g., all events do not necessarily have to be presented as beeps or light flashes).

As another example, credential data may be split across a plurality of credentials and each credential in the plurality of credentials may comprise only a portion of the complete valid credential data. In this situation, the user would be required to present the multiple credentials, possibly in a predetermined sequence, such that the reader 104 is enabled to assemble the complete credential data before sending the credential data to the networked device 108. Each portion of the credential data may have a particular secret associated therewith or the entire credential data may have only a single secret associated that needs to be entered to allow the data to be transmitted. Alternatively, a multicredential card that has the same credential written in different areas may be used and it may be required that the reader authenticate all of the different types of data provided to it from the multicredential card. As an example, the multicredential card may emulate a proximity credential, a smartcard credential, and a mifare credential. Data for each credential may be maintained in the different areas of the credential's memory even though the data is the same (albeit in a different format). As a part of analyzing the credential data, the reader 104 may check to see if the different types of data all match one another before continuing with a second factor of authentication.

In some embodiments, it may be possible to selectively alter whether or not the reader 104 requires a single factor of authentication or multiple factors of authentication before permitting user access. For example, the event-based factor of authentication may be selectively turned on and off depending upon the time of day or whether there is an increased need for security. More specifically, the second factor of authentication may be required after hours whereas only a single factor of authentication is required during business hours.

One advantage of utilizing event-based user inputs as compared to traditional user inputs is that a reader 104 can be configured to test a user's knowledge of a secret without being provided with a keypad or similar user input device. Rather, older or simpler readers 104 having only limited user interface capabilities may be enabled to receive user inputs as an event-based user input. Furthermore, since keypads and other user inputs traditionally provide a target for vandalism and often act as a point of failure in a reader 104, more robust and durable readers 104 can be provided which are still capable of performing dual-factor authentication functions.

A number of enhancements to the embodiments discussed herein may be envisioned without departing from the scope of the present invention. In some embodiments, the reader 104 may be provided with a diverse set of "events" (e.g., display patterns or sequences) from which a different "event" may be displayed in response to any presentation of any card, and the user's successful response depends upon both the event and the shared secret, according to a formula, algorithm, or rule which the user computes or applies to the "event".

For example, in one implementation, the rule would be, "If your secret number is N, watch for the color of the Nth flash, and then remove your card after that color has been flashed N more times." With this example, a user whose secret number is "3" would be successful in the first two of the following three sequences:

(Present Card) Red Green Red Green Red Red Green Red (Remove Card) Green Red
(Present Card) Red Red Green Red Green Red Red Green Red Green (Remove Card) Red
(Present Card) Green Green Red Red Green Red Green Red Red Green (Remove Card) Red Green Red Of course, not only can different users (or cards) be given different secret numbers, but different cards could require different rules; in such case, a different user whose secret number is also "3" could be successful only with the third sequence, but not the first two (whereas the second user's secret rule is, "If your secret number is N, watch the colors of the first N flashes, and then watch for the first occurrence of the opposite N colors."). These two users could not easily deduce each other's secret number even if they could observe each other's successful access.

In other words, the second factor is still "what you know," but you prove you know it, without revealing it to an observer, by how you respond to a varied "event" (solve a puzzle, perform a computation, apply a rule, etc.).

Also, of course, if the reader 104 can display digits or accept keypad presses, then more sophisticated formulas, algorithms, or rules are possible.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising
detecting, at a reader, a credential within a read range of the reader;
receiving, at the reader, credential data from the credential;
detecting, at the reader, user input related to a sequence of multiple events controlled by the reader to count time, wherein the sequence of multiple events controlled by the reader to count time is selected from a group of possible events including: (i) a plurality of light flashes; (ii) a plurality of illuminated light sources; (iii) a pattern of illuminated versus non-illuminated light sources; (iv) a color of a light source; and (v) a plurality of beeps emitted by the reader;
analyzing the event-based user input, wherein the event-based user input corresponds to a single user action detected at a particular time during the sequence of multiple events controlled by the reader to count time;
based on a successful authentication of the event-based user input, releasing the credential data from the reader; and
upon determining that the credential data and the event-based user input are both valid, permitting user access to an asset protected by the reader.

2. The method of claim 1, further comprising:
analyzing the credential data at the reader.

3. The method of claim 2, wherein the credential data is split across a plurality of credentials and wherein the credential data is determined to be valid when each of the plurality of credentials are presented in a predetermined order.

4. The method of claim 1, wherein the sequence of multiple events controlled by the reader comprise at least one of flashing a light and beeping a buzzer a plurality of times.

5. The method of claim 1, wherein the event-based user input comprises monitoring and detecting a user action that occurs at a predetermined time during presentation of the sequence of multiple events controlled by the reader.

6. The method of claim 1, wherein a valid event-based user input comprises an N-digit PIN that is specific to the user and wherein the event-based user input is detected by monitoring an amount of time that a credential is selectively presented and not presented to the reader during presentation of the sequence of events controlled by the reader.

7. A reader, comprising:
a network interface that enables the reader to communicate with a networked device;
a credential interface that enables the reader to communicate with a credential carried by a user and receive information from the credential describing a sequence of multiple events to be performed by the reader in connection with proving the user's knowledge of a secret;
a user interface configured to present the sequence of multiple events to the user as a count of time;
a processor; and
computer memory coupled with the processor, the computer memory comprising instructions that enable the processor to perform the following functions:
monitor user reactions to the sequence of events, the user reactions including moving a credential closer to or further away from the reader at a particular time during a display of the sequence of multiple events; and
determine, based on the user reaction, whether the user has provided a valid event-based user input that proves the secret is known by the user;
wherein the reader forwards credential data to a networked device for analysis only in response to the processor determining that the event-based user input is valid.

8. The reader of claim 7, wherein the user interface does not include a user input device.

9. The reader of claim 7, wherein the user interface comprises at least one Light Emitting Diode (LED).

10. The reader of claim 7, wherein the user interface comprises at least one of a buzzer and speaker.

11. The reader of claim 7, wherein the instructions, when executed by the processor, further enable the processor to determine whether a credential presented by the user is within a read range of the reader as a part of monitoring the user reaction to the sequence of events.

12. The reader of claim 11, wherein the reader further retrieves credential data from the credential presented by the user.

13. A method of performing dual-factor authentication, comprising:
receiving, at a reader, credential data from a credential;
analyzing the credential data;
upon determining that the credential data is valid, presenting to a user of the credential a sequence of multiple events controlled by the reader to count time, wherein the sequence of multiple events controlled by the reader to count time is selected from a group of possible events including: (i) a number of light flashes; (ii) a number of illuminated light sources; (iii) a pattern of illuminated versus non-illuminated light sources; (iv) a color of a light source; and (v) a number of beeps emitted by the reader;
receiving, at the reader, user input related to the sequence of events controlled by the reader to count time;
analyzing the event-based user input, wherein the event-based user input corresponds to a single user action detected at a particular time during the sequence of multiple events controlled by the reader to count time; and
based on a successful authentication of the event-based user input and determination that the credential data is valid, permitting the user access to an asset protected by the reader.

14. The method of claim 13, wherein the user input includes moving the credential closer to or further away from the reader during the presentation of the sequence of events.

15. The method of claim 13, wherein the reader forwards the credential data to a networked device for analysis only in response to determining that the event-based user input is valid.

16. The method of claim 13, wherein a valid event-based user input comprises an N-digit PIN.

17. The method of claim 13, wherein the credential data includes information that is used by the reader to select the sequence of multiple events from the group of possible events.

18. The method of claim 17, wherein the information that is used by the reader to select the sequence of multiple events from the group of possible events changes over time.

19. The method of claim 13, wherein the credential data is split across a plurality of credentials and wherein the credential data is determined to be valid when each of the plurality of credentials are presented in a predetermined order.

* * * * *